United States Patent [19]

Inoue

[11] 4,392,195

[45] Jul. 5, 1983

[54] METHOD OF AND APPARATUS FOR CONTROLLEDLY MOVING A MOVABLE ELEMENT

[75] Inventor: Kiyoshi Inoue, Tokyo, Japan

[73] Assignee: Inoue-Japax Research Incorporated, Yokohama, Japan

[21] Appl. No.: 192,876

[22] Filed: Oct. 1, 1980

[30] Foreign Application Priority Data

Oct. 3, 1979 [JP] Japan ................................ 54-128229

[51] Int. Cl.³ ............................................ G06F 15/46
[52] U.S. Cl. ................................ 364/167; 219/69 W; 318/571; 364/474
[58] Field of Search ................. 364/474, 475, 167–171, 364/557; 318/571, 572, 601, 603; 219/69 W, 69 C, 69 G, 69 M

[56] References Cited

U.S. PATENT DOCUMENTS

| | | | |
|---|---|---|---|
| 3,691,357 | 9/1972 | McIntosh | 364/474 X |
| 3,735,157 | 5/1973 | Whetham | 318/571 X |
| 3,793,511 | 2/1974 | Bala et al. | 318/571 X |
| 4,078,195 | 3/1978 | Mathias et al. | 364/474 X |
| 4,131,837 | 12/1978 | Whetham | 364/474 X |
| 4,291,262 | 9/1981 | Nakajima | 318/571 X |

FOREIGN PATENT DOCUMENTS

| | | | |
|---|---|---|---|
| 802206 | 10/1958 | United Kingdom | 364/474 |
| 1211418 | 11/1970 | United Kingdom | 364/474 |
| 1244624 | 9/1971 | United Kingdom | 364/474 |
| 1516983 | 7/1978 | United Kingdom | 364/474 |

Primary Examiner—Joseph F. Ruggiero
Attorney, Agent, or Firm—Karl F. Ross; Herbert Dubno

[57] ABSTRACT

A method of and apparatus for controlledly moving a movable element in a machine tool having a drive unit drivingly coupled to the movable element, a motor drivingly coupled to the drive unit and a motor driver circuit for energizing the motor to drive the drive means, thereby moving the movable element, wherein a sequence of feed signals are furnished from a command source to energize the motor for the purpose of achieving a corresponding and desired sequence of movements of the movable element. The apparatus includes: a first sensing unit directly responsive to a displacement of the movable element resulting from the application of each of the sequential feed signals to the motor driver circuit for providing a first signal as a function of the displacement; a second sensing unit responsive to the feed signals for providing a sequence of second signals each as a function of each of the sequential feed signals; a memory unit for successively memorizing on a memory medium the first signals corresponding to the sequence of the second signals; a readout unit for the memory medium to successively reproduce the first signals therefrom corresponding to the sequence of the second signals; and a logic unit for processing the reproduced first signals and the feed signals to provide the sequence of revised feed signals and sequentially applying the revised feed signals to the motor driver circuit, thereby achieving the desired sequence of movements of the movable element.

28 Claims, 3 Drawing Figures

METHOD OF AND APPARATUS FOR CONTROLLEDLY MOVING A MOVABLE ELEMENT

FIELD OF THE INVENTION

The present invention relates generally to machine tools such as milling, cutting, boring and grinding machines as well as traveling-wire or wire-cutting EDM (electrical discharge machining) machines, sinking-type EDM machines and other electroerosion or electrical machining equipments. More particularly, the invention relates to a method of and apparatus for controlledly moving a movable element such as a tool, tool electrode or workpiece, or tool holder, worktable or carriage supporting a tool or workpiece.

BACKGROUND OF THE INVENTION

In a machine tool, a drive member such as a lead-screw arrangement is commonly coupled drivingly with a movable element and driven by motor means such as a DC motor or stepping motor energized by a feed signal to achieve a given movement of the movable element. In a numerical-controlled (NC) machine tool, the feed signal is a stream of pulses based upon digital commands preprogrammed on a record medium so that the desired movement may be performed as accurately as possible in accordance with the programmed commands. Such drive systems, however, commonly entail conversion of electrical to mechanical signals and further conversion of rotary mechanical to longitudinal signals or displacements. Thus, a mechanical error unavoidably develops in the stage of conversion due, for example, to an error in the lead or pitch of a lead screw and a backlash in various components. As a result, a precision electrical command is not accurately reproduced in a desired movement of the movable element. These errors are inherent in each particular machine tool and cannot generally be compensated for by a process of preprogramming with the conventional systems.

OBJECTS OF THE INVENTION

It is, accordingly, an object of the present invention to provide an improved method of and apparatus for controlledly moving a movable element in a machine tool, which method and apparatus overcome the aforementioned problems encountered in the prior art.

Another object of the invention is to provide a method of and apparatus for controlledly moving a movable element in a machine tool whereby an extremely high precision of the displacement of the movable member is assured.

SUMMARY OF THE INVENTION

These and other objects of the invention is attained, in accordance with a first aspect thereof, by providing a method of controlledly moving a movable element in a machine tool having a drive member drivingly coupled to the movable element, motor means drivingly coupled to the drive member and motor driver circuit means for energizing the motor means to drive the drive member, thereby moving the movable element, the method comprising the steps of: (a) applying a sequence of feed signals from a command source to the motor driver circuit means, thereby energizing the motor means to achieve the corresponding sequence of desired movements of the movable element; (b) sensing a displacement of the movable element resulting from the application of each of the sequential feed signals to the motor driver circuit means to provide a first signal as a function of the said displacement; (c) sensing the sequential feed signals to provide a sequence of second signals each as a function of each of the sequential feed signals; (d) successively memorizing on a memory medium the first signals corresponding to the sequential second signals; (e) successively reproducing the first signals memorized on the memory medium corresponding to the sequential second signals while permitting the feed signals to be sequentially issued from the command source; and (f) processing the reproduced first signals and the issued feed signals to provide the sequence of revised feed signals and applying the revised feed signals sequentially to the motor driver means, thereby achieving the desired movements in sequence of the movable element.

Specifically, the step (b) may comprise producing the first signal as a deviation of the sensed displacement of the movable element from a desired displacement thereof dictated by the feed signal.

In step (c) the second signal may be produced by sensing an operating displacement of the motor means resulting from the application of each of the sequential feed signals to the drive circuit means. The step (b) may comprise producing the first signal as a deviation of the sensed displacement of the movable element from the operating displacement of the motor means.

In step (c) the second signal may alternatively be produced by sensing an operating displacement of the drive member resulting from the application of each of the sequential feed signals to the motor driver circuit means. The step (b) may comprise producing the first signal as a deviation of the sensed displacement of the movable element from the operating displacement of the drive member.

In step (d) the first signals may be successively memorized on the memory medium corresponding directly to the sequential feed signals. In step (e) the first signals may be successively reproduced corresponding directly to the sequential feed signals.

In step (b) the displacement of the movable element is advantageously sensed by measuring the position of the movable element with a laser beam.

The method according to the present invention may further include the steps of sensing a temperature of at least one critical machine component, converting the sensed temperature into a corresponding electrical signal representing a thermal deformation of the said component, deriving from the electrical signal a correction signal and combining the feed signals and the correction signal to compensate for an error in positioning the movable element due to the thermal deformation of the said component. At least one component may include the movable element. The electrical signal may be memorized in conjunction with step (d) and reproduced in conjunction with step (e). The correction signal may then be combined with the feed signals in conjunction with step (e) or step (f).

In accordance with a second aspect of the invention, there is provided an apparatus for controlledly moving a movable element in a machine tool, the apparatus comprising: a drive means drivingly coupled to the movable element; motor means drivingly coupled to the driver means; motor driver circuit means for energizing the motor means to drive the drive means, thereby moving the movable element; a command source for applying a sequence of feed signals to the motor driver circuit means, thereby energizing the motor means to achieve a corresponding sequence of desired movements of the movable element; first sensing means responsive to a displacement of the movable element resulting from the application of each of the feed signals to the motor driver circuit means for providing a first signal as a function of the said displacement; second sensing means responsive to the feed signals for providing a sequence of second signals each as a function of each of the sequential feed signals; memory means for successively memorizing the first signals corresponding to the sequential second signals; readout means for the memory means to successively reproduce the first signals corresponding to the sequential second signals; and logic means for processing the reproduced first signals and the feed signals to provide a sequence of revised feed signals and sequentially applying the revised feed signals to the motor driver circuit means, thereby achieving the desired sequence of movements of the movable element.

Specifically, the first sensing means may be adapted to provide the first signal as a deviation of the actual displacement of the movable element from a desired displacement thereof dictated by said feed signals.

The second sensing means may be responsive to an operating displacement of the motor means resulting from the application of each of the feed signals to the motor driver circuit means. The first sensing means may then be adapted to provide the first signal as a deviation of the sensed displacement of the movable element from the operating displacement of the motor means.

The second sensing means may also be responsive to an operating displacement of the drive means resulting from the application of each of the feed signals to the motor driver circuit means. The first sensing means may then be adapted to provide said first signal as a deviation of said displacement of the movable element from the operating displacement of the drive means.

The memory means may be adapted to successively memorize the first signals corresponding directly to the sequence of the feed signals.

The readout means may be adapted to successively reproduce the first signals corresponding directly to the sequence of the feed signals.

The first sensing means advantageously comprises means for measuring the position of the movable element with a laser beam.

The apparatus according to the invention may further include means for measuring a temperature of at least one critical machine component, means for converting the sensed temperature into a corresponding electrical signal representing a thermal deformation of the said component, means for deriving from the electrical signal a correction signal and means for combining the feed signals and the correction signal to compensate for an error in positioning the movable element due to the thermal deformation of the said component. The component may include a workpiece, which may in turn constitute the movable element and a member for supporting a tool used to machine the workpiece.

BRIEF DESCRIPTION OF DRAWING

These and other objects, features and advantages of the present invention will become more readily apparent from the following description, reference being made to the accompanying drawing in which.

SPECIFIC DESCRIPTION

Figure 1:
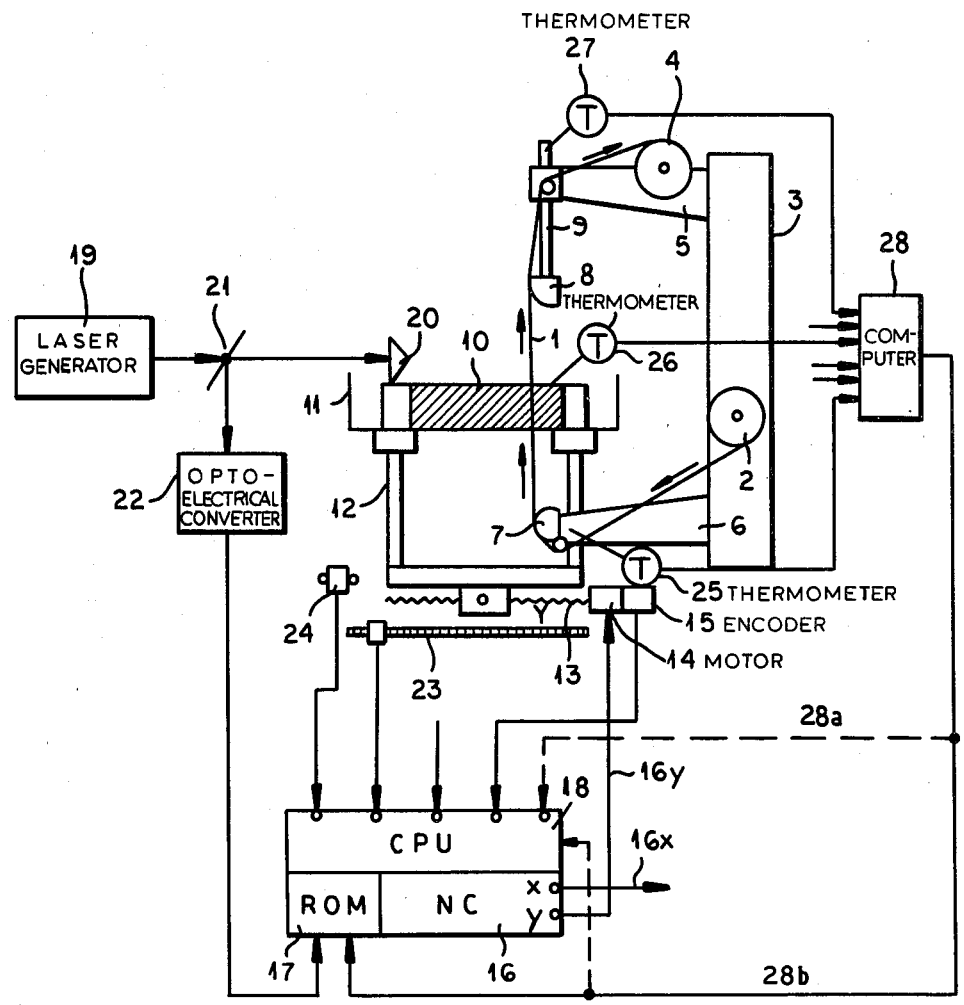
FIG. 1 is a schematic view partly in section and partly in block form diagrammatically illustrating an apparatus embodying the present invention.

Referring to FIG. 1 the principles of the present invention are shown embodied in a traveling-wire or wire-cutting EDM machine. The machine includes a continuous wire electrode 1 which may be composed of copper or a copper alloy such as brass and may have a thickness or diameter of 0.05 to 0.5 mm. The wire electrode 1 is fed continuously from a supply reel 2 shown mounted on a column 3 of the machine and is collected onto a takeup reel 4 shown mounted on an arm 5 extending from the column 3. Another arm 6 extends from the column 3 and has at its end a first wire-guide member 7. A second wire-guide member 8 is attached to a spindle 9 which is supported in a vertically displaceable manner by the upper arm 5. Thus, the wire electrode 1 is guided over the lower guide member 7 and the upper guide member 8 whose spacing is regulated by positioning the spindle 9 by means (not shown) and is axially advanced between these members by drive means (not shown) but arranged in the path of wire travel on the side of the takeup reel 4 to give a suitable tension to the traveling wire electrode 1.

A workpiece 10 is disposed in a machining relationship with the wire electrode 1 continuously traveling between the wire guide members 7 and 8. The workpiece 10 is fixedly mounted in a worktank 11 which is securely carried on a worktable assembly 12. A machining fluid, e.g. water, is supplied to the region of the workpiece 10 and the wire electrode 1 from one or more nozzles (not shown), while an EDM power supply (not shown) is connected electrically to the wire electrode 1 and the workpiece 1, to apply a succession of machining pulses across a fluid-filled machining gap formed between the traveling wire electrode 1 and the workpiece to remove material from the latter.

Shown at 13 is a feed or lead screw coupled to the table assembly 12 and rotated by a motor 14 to longitudinally move the table assembly 12 in the direction of a Y-axis. An encoder 15 is provided coupled rotatably with the rotary shaft of the motor 14 to sense an angular displacement thereof. Although not shown, an X-axis feed or lead screw is similarly coupled to the table assembly 12 and is driven similarly by an X-axis motor (not shown) to move the assembly 12 longitudinally in the direction of an X-axis which extends perpendicular to the sheet of drawing. An encoder is similarly provided coupled rotatably with the rotary shaft of the X-axis motor to sense an angular displacement thereof.

A drive or feed signal to each of the X-axis and Y-axis motors is supplied along a line 16X, 16Y from a numerical controller (NC) 16 which is here provided with a control memory circuit unit 17 and a control logic circuit unit 18, each of which is to be described hereinafter. The control memory circuit 17 includes a memory unit which may be constituted by a ROM (read-only memory), a RAM (random-access memory) and a magnetic tape conveniently held in a cassette for ease of insertion and removal. The control logic circuit unit 18 may conveniently be constituted by a computer or central processing unit (e.g. microcomputer or microprocessor) to permit the unit 16 to perform the computerized numerical control (CNC) functions.

Shown at 19 is a laser generator designed to emit a laser beam to the workpiece 10 to sense an actual displacement of the workpiece 10 with a high degree of precision. A prism 20 is disposed fixedly on the workpiece 10 surface and a mirror 21 is disposed in the path of the laser beam to direct the laser beam reflected by the workpiece 10 surface to an optoelectrical converter 22 whose output electrical signals are applied to the control memory circuit unit 17. A reference scale along the Y-axis and a reference scale along the X-axis are shown at 23 and 24 respectively.

Further, thermometers 25, 26 and 27 are disposed in the regions of various critical machine components. Thus, the thermometer 25 may be used to sense the temperature at a support for the machining guide 7, the thermometer 26 to sense the temperature at the workpiece 10 and the thermometer 27 to sense the temperature at a support for the machining guide 8. Each of the thermometers 25, 26 and 27 is adapted to convert the sensed temperature signal to a corresponding electrical signal. The electrical signals are applied to a computer 28 whose output signal is applied to the control memory circuit unit 17 via a lead 28b or alternatively may be applied directly to the control logic circuit unit 18 via a lead 28a.

A desired machining or contouring pattern to be imparted to the workpiece 10 during the operation of the wire-cutting EDM machine illustrated is given by a sequence of paths of movement of the worktable assembly 12 effected both along X- and Y-axes by the X-axis motor and Y-axis motor 14. The sequence of paths of movement is in turn dictated by the correspondingly prescribed instructions programmed in the NC unit 16. To effect each path of movement along each axis, the NC unit 16 furnishes a corresponding feed signal to each motor. This precise feed signal will not, however, be converted accurately into the corresponding or desired feed movement of the worktable assembly 12 or the workpiece 10 due to error factors inherently present in the drive system, for example, an error in the pitch or lead of the lead screw 13 and a backlash in the associated components. In accordance with the principles of the invention, an error in the displacement of the moved element 12 or workpiece 10 is sensed and controlledly memorized and processed to provide a revision in the feed signal applied to each motor.

Figure 2:
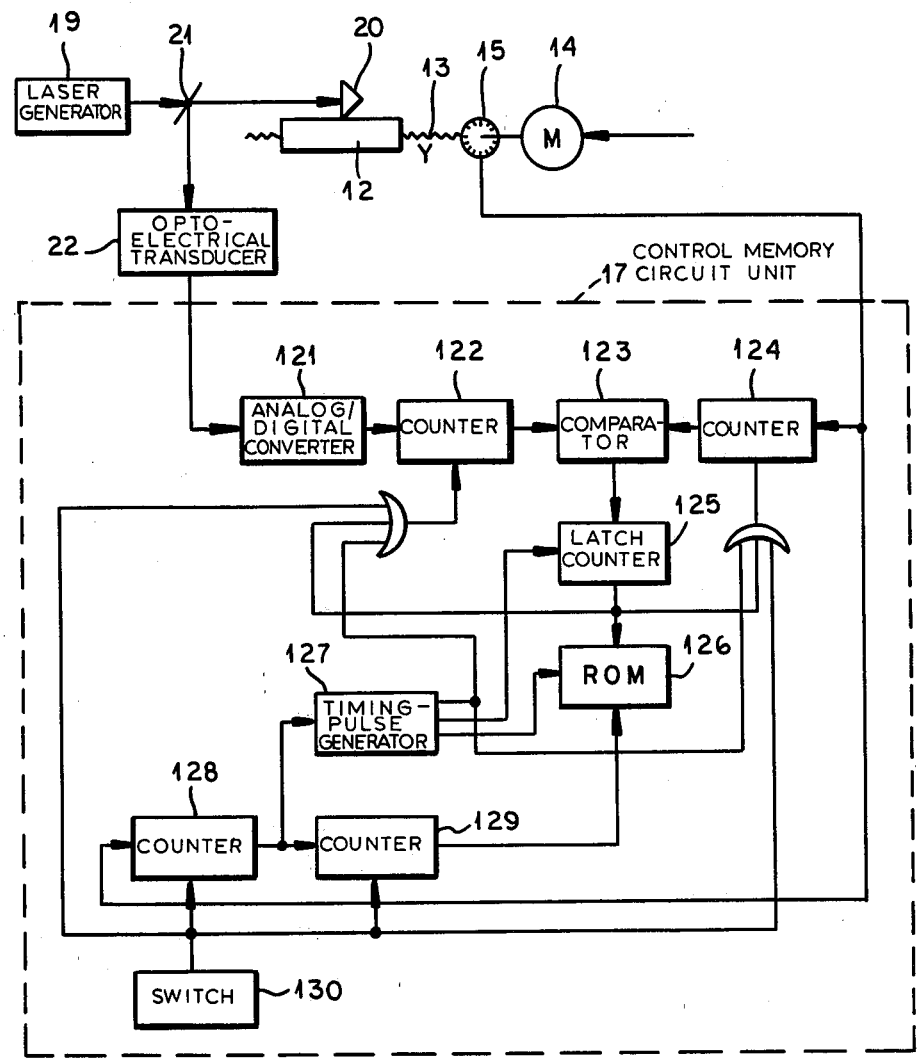
FIG. 2 is a schematic diagram essentially in a block form illustrating, inter alia, a memory control unit, constituting a portion of the embodiment of FIG. 1.

Referring to FIG. 2, the structure and operation of a certain embodiment of the control memory circuit unit 17 may be described. In this arrangement which relates to the Y-axis movement by way of example, the optoelectrical transducer 22 provides the control memory circuit unit 17 with an analog input which represents the position of the workpiece 10 sensed through the laser beam. The control memory circuit unit 17 comprises an analog-to-digital (AD) converter 121 which converts the analog position signal into a train of digital pulses which are counted by a counter 122 while the sensing output pulses of the encoder 15 are counted by a counter 124. A comparator 123 compares the count levels of the counters 122 and 124 and provides a difference in counts which is latched or temporarily stored in a latch counter 125. The sensing output pulses of the encoder 15 are also counted by counters 128 and 129 to cause a successive operation of a read-only-memory (ROM) 126. A timing pulse generator 127 is responsive to an output of the counter 128 to provide a timing pulse each time an increment of displacement is counted to enable the signal latched in the circuit 125 to be memorized in the ROM 126. Each instant a timing pulse is generated, both counters 122 and 124 are cleared and the differential count between the actual displacement of the workpiece 10 and the output of the encoder per each increment of displacement is transferred from the latch counter 125 to the ROM 126. Thus the differential values in the successive increments of displacement are successively accumulated and stored in the ROM 126. A switch 130 is used to clear the count of all the counters.

The actual displacement of the workpiece 11 is measured with an extremely high degree of accuracy by the laser arrangement 19, 20, 21 and 22. A differential value between such an actual displacement of the moved member 10 measured and an encoder 14 output which represents a displacement of the motor 14 shaft effected in response to a feed signal is thus ascertained for each incremental feed, the values being successively memorized over successive incremental feeds. The memorizing operation is performed prior to a given machining operation. Thus an error inherent in the lead screw 13 which gives rise to an error in the actual displacement of the moved member, the workpiece 10 or the worktable assembly 12 is memorized in the ROM 126 in each of a sequence of incremental feeds directed by preprogrammed instructions of the NC unt 16. The memorized error in the ROM 126 is read out and the corrected feed signals are applied to the motor 14.

Figure 3:
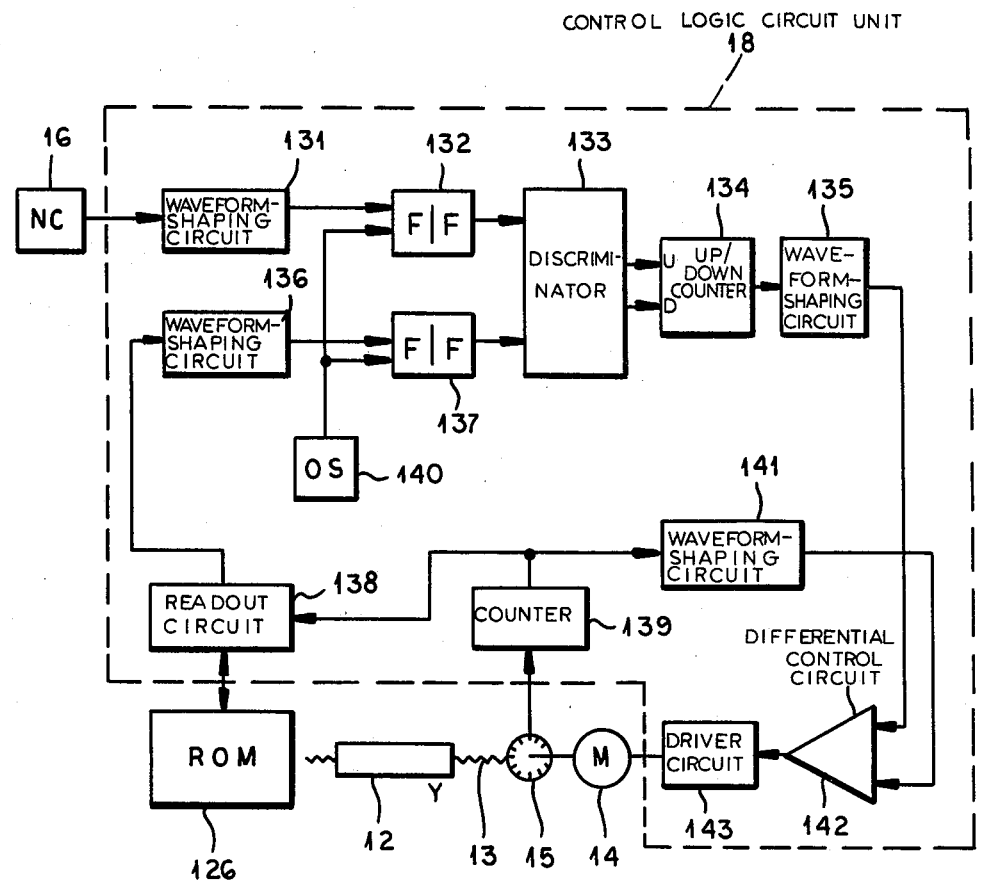
FIG. 3 is a schematic diagram essentially in a block form illustrating, inter alia, a logic circuit unit constituting a portion of the embodiment of FIG. 1.

FIG. 3 shows an embodiment of the control logic circuit unit 18. An explanation will again be given with reference to displacement along the Y-axis. A signal from the NC unit 16 is applied to a waveform-shaping circuit 131 whose output is applied to a flip-flop 132 which thus provide digital signals. The latter signals are applied via a discriminator 133 to the up or down terminal of an up/down or reversible counter 134. Meanwhile a preset counter 139 counts the sensing output pulses of the encoder 15 to provide an output signal which is applied to a read-out circuit 138 for the ROM 126. The memory in the latter is read out and applied to a waveform-shaping circuit 136. A flip-flop 137 converts the shaped signal to digital pulses which are applied via the discriminator 133 to the up or down terminal of the counter 134. The counter 134 performs a count-up or count-down until a preset upper or lower limit is reached. Then an output issues through a waveform-shaping circuit 135 and is applied to a differential control circuit 142 through a first input thereof and in turn a driver circuit 143 to controlledly drive the motor 14. A waveform-shaping circuit 141 is interposed between the counter 139 and a second input of the differential control circuit 142. An oscillator 140 is used to operate the two flip-flop 132 and 137.

In operation, the motor 14 is driven to drive the lead screw 13 which in turn moves the worktable assembly 12 and hence the workpiece 10. An angular displacement of the motor 14 or the lead screw 13 is sensed by the encoder 15, which thus produces pulses corresponding to the angular displacement effected in response to a feed signal applied to the motor 14. The encoder 15 here may also provide a rate signal from the number of pulses per unit time in addition to the position or displacement signal corresponding to the pulse number. The encoder 15 output is accumulated in the preset counter 139 and each time the sensed pulses reach a preset number the counter 139 issues a signal pulse to enable the readout circuit 138. The memory contents in the ROM 126 are thus successively read out by the circuit 138 and applied via the circuit 136 to the flip-flop 137 where they are converted into digital signals. The latter are then applied via the discriminator 133 to the counter 134 into which the preprogrammed feed signals are incoming from the NC unit 16. The counter 134 thus provides the feed signals revised by the error-compensating signals from the memory unit 126 through its differential counting operation. The revised feed signal from the counter 134 is reformed through the waveform-shaping circuit 135 and passes through the differential control circuit 142 and the driver circuit 143 to energize the motor 14, thereby precisely moving the worktable assembly 12 as commanded in spite of inherent error in the mechanical system connecting the motor 14 to the assembly 12.

The workpiece 10 is securely mounted on the worktable assembly 12 and is held in a predetermined machining position with the wire electrode 1. Accordingly a desired machining contour is achieved with an extremely high degree of precision. It should be apparent that a similar drive mechanism incorporating the error-compensation arrangement described hereinbefore may be used along one or more axes in an X-Z plane orthogonal to the Y-axis described.

It is apparent from the foregoing that in spite of presence of errors in pitch or lead of the feed screw 13 these errors are in effect ascertained by a high degree of precision measurement through the laser arrangement 19, 20, 21, 22 and an error in each of the incremental feeds is successively memorized in the control memory unit 17 preparatory to a given machining operation. In the actual machining operation, the memorized error signals are reproduced synchronously with the sequence of preprogrammed feed signals being supplied from the NC or command source 16 so that a revised sequence of feed signals develop and are applied to the motor, thereby precisely moving the movable element as desired.

The use of an encoder as a detector for providing a reference signal responsive to a feed signal is advantageous because this allows detecting the rate of displacement. Thus the output pulses of the counter 139 may be applied to the differential control circuit 142 and a rate-deviation signal which develops at the output of the differential control circuit 142 may be applied to the motor 14 to control the velocity or rate of angular displacement of its rotary shaft. In this manner a positioning control with an increased response sensitivity is achieved.

It has further been found that a thermal deformation (expansion) which various critical machine components suffer causes a serious machining positioning error. This error is effectively compensated for according to further features of the invention. Thus, as shown in FIG. 1, thermometers 25, 26 and 27 are disposed to sense the temperatures of the machining guide member 7 or its support arm 6, the workpiece 10 and the machining guide member 8 or its support member 9 to provide the corresponding electrical signals. The thermal deformation (expansion) of each part is known from the temperature thereof as sensed and the corresponding electrical signals as developed at the output of the thermometer 25, 26 and 27. The judgment circuit or computer 28 fed with the temperature signals then analyzes the influences of the thermal deformation (expansions) of the respective parts on the effective position of the workpiece 10 relative to the axis of the traveling wire tool 1 and provides a compensation signal which can be applied via a line 28a directly to the logic circuit 18, thereby revising the feed signal applied to the motor 14. The circuit 28 may alternatively be a simple joining circuit and then the analysis may be conducted by the logic circuit 18. The judging circuit or computer 28 may also provide a sequence of signals representing the influence of the thermal expansion of the sensed components on the position of the workpiece known as a function of time. The sequence of such signals may be applied via a line 28b to the memory unit 17 and the memorized signals may be reproduced and applied to the preprogrammed feed signals from the NC unit 16 in the course of machining operation. An increased machining accuracy is thus achieved irrespective of thermal deformations (expansions) of those critical machine components.

It will be understood that the motor in the system may be either of rotary or linear type. An AC motor may be provided with a phase-controlled driver circuit. A stepping motor and a DC motor should, of course, be fed by "pulsing" and "continuous" drive circuits, respectively, which are well known in the art. A fluid motor or electrofluidic motor may likewise be employed. Means for sensing the operating displacement of the motor or the drive member (e.g. lead screw) is advantageously constituted by an encoder of rotary type as shown in or of linear type, although any other detector of the similar function may alternatively be employed such as an inductor tachometer, moire-fringe sensor, resolver or magnetic scale. The command source is advantageously an NC unit of conventional design but may be a copying system of known form. The means directly responsive to a displacement of the movable member is not limited to the laser arrangement shown but, among others, may advantageously make use of an ultrasonic sensing system as described in my copending patent application Ser. No. 038,174 filed May 11, 1979 now U.S. Pat. No. 4,294,121.

There is thus provided an improved method as well as apparatus for controlledly moving a movable member in a machine tool whereby an extremely high displacement accuracy is assured.

What is claimed is:

1. A method of controlledly moving a movable element in a machine tool having a drive member drivingly coupled to the movable element, motor means drivingly coupled to the drive member, and motor driver circuit means for energizing the motor means to drive the drive member, thereby moving the movable element, said method comprising the steps of:
   (a) applying a sequence of feed signals from a command source to said motor driver circuit means, thereby energizing said motor means to achieve a corresponding sequence of desired movements of said movable element;
   (b) sensing an actual displacement of said movable element resulting from the application of each of said feed signals to said driver circuit means and said motor means to provide a first signal as a function of said actual displacement;
   (c) sensing said feed signals to provide a sequence of second signals each as a function of each of said feed signals;

(d) successively memorizing on a memory medium, said first signals corresponding to the sequence of said second signals;

(e) successively reproducing said first signals memorized on said memory medium corresponding to the sequence of said second signals while permitting said feed signals to be issued in sequence from said command source; and (f) processing said reproduced first signals and said feed signals to provide a sequence of revised feed signals and applying said revised feed signals to said driver circuit means, thereby achieving the desired movements in sequence of said movable element.

2. The method defined in claim 1 wherein step (b) comprises producing said first signal as a deviation of said actual displacement of the movable element from a desired displacement thereof dictated by said feed signal.

3. The method defined in claim 1 wherein in step (c) said second signal is produced by sensing an operating displacement of said motor means resulting from the application of each of said feed signals to said motor driver circuit means.

4. The method defined in claim 3 wherein step (b) comprises producing said first signal as a deviation of said actual displacement of the movable element from said operating displacement of the motor means.

5. The method defined in claim 1 wherein in step (c) said second signal is produced by sensing an operating displacement of said drive member resulting from the application of each of said feed signals to said motor driver circuit means.

6. The method defined in claim 5 wherein the step (b) comprises producing said first signal as a deviation of said actual displacement of the movable element from said operating displacement of the drive member.

7. The method defined in claim 1, claim 2, claim 3, claim 4, claim 5 or claim 6 wherein in step (d) said first signals are successively memorized on said memory medium corresponding directly to the sequence of said feed signals.

8. The method defined in claim 1, claim 2, claim 3, claim 4, claim 5 or claim 6 wherein in step (e) said first signals memorized on said memory medium are successively reproduced corresponding directly to the sequence of said feed signals.

9. The method defined in claim 7 wherein in step (e) said first signals memorized on said memory medium are successively reproduced corresponding directly to the sequence of said feed signals.

10. The method defined in claim 1 wherein in step (b) said displacement of the movable element is sensed by measuring the position of said movable element with a laser beam.

11. A method as defined in claim 1, further comprising the steps of sensing a temperature of at least one critical machine component, converting the sensed temperature into a corresponding electrical signal representing a thermal deformation of said component, deriving from said electrical signal a correction signal and combining said feed signals and said correction signal to compensate for an error in positioning said movable element due to the thermal deformation of said component.

12. The method defined in claim 11 wherein said at least one component includes said movable element.

13. The method defined in claim 11 wherein said electrical signal is memorized in conjunction with step (d) and is reproduced in conjunction with step (e).

14. The method defined in claim 11 wherein said correction signal is memorized in conjunction with step (d) and is reproduced in conjunction with step (e).

15. An apparatus for controlledly moving a movable element in a machine tool, comprising:

a drive means drivingly coupled to said movable element;

motor means drivingly coupled to said drive member;

motor driver circuit means for energizing said motor means to drive said drive member, thereby moving said movable element;

a command source for applying a sequence of feed signals to said motor driver circuit means, thereby energizing said motor means to achieve a corresponding sequence of desired movements of said movable element;

first sensing means directly responsive to an actual displacement of said movable element resulting from the application of each of said feed signals to said driver circuit means and said motor means for providing a first signal as a function of said actual displacement;

second sensing means responsive to said feed signals for providing a sequence of second signals each as a function of each of said feed signals;

memory means for successively memorizing said first signals corresponding to a sequence of said second signals;

readout means for said memory means to successively reproduce said first signals corresponding to a sequence of said second signals; and logic means for processing said reproduced first signals and said feed signals to provide a sequence of revised feed signals and sequentially applying said revised feed signals to said driver circuit means and said motor means, thereby achieving the desired sequence of movements of said movable element.

16. The apparatus defined in claim 15 wherein said first sensing means is adapted to provide said first signal as a deviation of said actual displacement of the movable element from a desired displacement thereof dictated by said feed signal.

17. The apparatus defined in claim 15 wherein said second sensing means is responsive to an operating displacement of the motor means resulting from the application of each of said feed signals to said drive circuit means.

18. The apparatus defined in claim 17 wherein said first sensing means is adapted to provide said first signal as a deviation of said displacement of the movable element from said operating displacement of the motor means.

19. The apparatus defined in claim 15 wherein said second sensing means is responsive to an operating displacement of said drive means resulting from the application of each of said feed signals to said drive circuit means.

20. The apparatus defined in claim 19 wherein said first sensing means is adapted to provide said first signal as a deviation of said displacement of the movable element from said operating displacement of the drive means.

21. The apparatus defined in claim 15, claim 16, claim 17, claim 18, claim 19 or claim 20 wherein said memory means is adapted to successively memorize said first signals corresponding directly to the sequence of said feed signals.

22. The apparatus defined in claim 15, claim 16, claim 17, claim 18, claim 19 or claim 20 wherein said readout means is adapted to successively reproduce said first signals corresponding directly to the sequence of said feed signals.

23. The apparatus defined in claim 21 wherein said readout means is adapted to successively reproduce said first signals corresponding directly to the sequence of said feed signals.

24. The apparatus defined in claim 15 wherein said first sensing means comprises means for measuring the position of said movable element with a laser beam.

25. An apparatus as defined in claim 15, further comprising thermo-sensing means for measuring a temperature of at least one critical machine component, means for converting the sensed temperature into a corresponding electrical signal representing a thermal deformation of said component, means for deriving from said electrical signal a correction signal and means for combining said feed signals and a correction signal to compensate for an error in positioning said movable element due to the thermal deformation of said component.

26. The apparatus defined in claim 25 wherein said at least one critical component includes said movable element.

27. The apparatus defined in claim 26 wherein said movable element is a workpiece.

28. The apparatus defined in claim 27 wherein said at least one critical component includes at least one member for supporting a tool for machining said workpiece.

* * * * *